Patented Oct. 7, 1924.

1,510,779

UNITED STATES PATENT OFFICE.

RICHARD HERRMANN, OF BERLIN, GERMANY, ASSIGNOR, BY MESNE ASSIGNMENTS, TO AMERICAN CELLONE COMPANY INCORPORATED, OF NEW YORK, N. Y.

PROCESS FOR THE PRODUCTION OF PRESSED MASSES, MOLDED ARTICLES, AND THE LIKE FROM COMPOUNDS OF CELLULOSE WITH AN ORGANIC SUBSTANCE.

No Drawing.    Application filed August 27, 1921. Serial No. 496,077.

*To all whom it may concern:*

Be it known that I, RICHARD HERRMANN, a citizen of the German Republic, residing at 65 Rheinsbergerstrasse, Berlin, Germany, have invented certain new and useful improvements in processes for the production of pressed masses, molded articles, and the like from compounds of cellulose with an organic substance, of which the following is a specification.

This invention relates to a process for the production of pressed masses, molded articles, and the like from cellulose esters, particularly cellulose acetate.

As is well known it has been found possible to produce plastic masses from cellulose acetate by means of camphor substitutes in the presence of volatile solvents in a similar way as is done with camphor in the case of nitro-cellulose by intensive mechanical working in a pug mill and on grinding rollers. Such masses, when cut into slabs and rods, followed by gradual evaporation of the solvents, and prolonged drying (months have been required for large articles), yield a celluloid-like material which is equivalent to celluloid.

However, it has not hitherto been possible to press cellulose esters, and particularly cellulose acetate, direct into the form of molded articles in a similar way as is done with other materials, especially ebonite, so that the wide field of production of pressed and molded articles, parts of apparatus, insulating materials, and even the production of ebonite-like articles of large dimensions (cylinders, thick-walled tubes, cubes and the like) was excluded so far as cellulose esters and particularly cellulose acetate were concerned.

All attempts failed by reason of the fact that the usual mode of operation, i. e., the use of only medium pressure and medium temperature either failed to impart shape to the cellulose esters, for example cellulose acetate, at all, or only formed them into heterogeneous conglomerations or porous masses of insufficient stability. Moreover the articles produced in the celluloid industry, uninflammable celluloid industry, rubber and ebonite industry and the like could only be produced in the manufacturers' own workshops and required extensive mechanical plants for converting them into the finished articles.

If therefore a satisfactory and economical process for the direct production of such articles of any desired shape or form from cellulose esters, particularly cellulose acetate, can be devised, the commercial possibilities and advantages of such a process are too obvious to those skilled in the art to need elucidation.

The object of the present invention is based on the unexpected fact that if cellulose esters, particularly cellulose acetate, be first transformed into a finely disintegrated state and thereupon exposed to a heavy pressure of about 100–150 atmospheres, at a high temperature which is close to the decomposition point, completely homogeneous pressed masses of great mechanical stability are obtained. Peculiarly enough the process can be carried out more easily and the strength of the pressed mass can be increased if the cellulose ester, e. g., cellulose acetate, is not pure, but is mixed in the disintegrated state with inert filling materials such as for example mineral powders, prior to being pressed, although in the hitherto known processes for the production of plastic masses from cellulose esters, such an admixture of mineral powders had an unfavourable influence and made the plastic masses brittle and useless.

Plastifying agents or camphor substitutes may be added to the cellulose esters or cellulose acetate in order to reduce the hardness or to impart greater elasticity to the pressed mass. However, the use of such additions is not required in the present process, although, as is well known, it is absolutely essential for the production of plastic masses from cellulose acetate.

Whereas the plastic masses made from a mixture of cellulose acetate and camphor substitute already decompose and blister when heated to a temperature of 100–110° C., it has been unexpectedly found that a mixture of cellulose acetate and camphor substitutes, according to the present process, can be worked at a high temperature and under high pressure without any decomposition.

For carrying out the process the presence of solvents for the cellulose ester or cellulose acetate, such as for instance acetone, or volatile non-solvents, such as for instance benzol, is not required, and even impairs the process when used in large quantities. However small amounts of such volatile substances may be added and also of such substances as for example water, which neither dissolve cellulose acetate nor the plastifying agents or camphor substitute. Also solid substances of a high vapour tension such as naphthalene may be added.

In the absence of such volatile substances it is possible to slightly reduce the temperature and pressure and nevertheless to obtain completely dry substances which in comparison with the plastic masses obtained from cellulose acetate, do not shrink, the volatile substances having been completely evaporated at the elevated temperature.

Although on account of the heavy pressure required for carrying out the process, it was first thought that it could only be employed for simple shapes such as for example for thick sheets, cubes, cylinders, rods, and that it was less applicable for complicated molded pieces, it has however, been found possible to also produce almost any molded article by pressing.

A suitably pressed mass which may also be pressed at a lower temperature and at a lower pressure may be obtained from the first pressed mass by subjecting same to a second pressing operation. For example, the first pressed mass may be obtained in the form of a block, by submitting a suitable mixture of cellulose ester, for example cellulose acetate, with any admixtures if desired, to heavy pressure and high temperature, said block being thereupon disintegrated into small pieces or ground into powder, this disintegrated mass being then again pressed into the final shape or form in the warm. This finely disintegrated mass cannot only be pressed with great ease but it can also be mixed with additional amounts of filling materials such as for instance, asbestos, baryta, mica, sawdust, cork-dust, or pigments, such as zinc-white, ochre, lampblack or soluble dyes, as well as inert organic or inorganic substances of any kind. In this second pressing operation, even when a large addition of filling materials has been given, very firm and mechanically strong molded articles are obtained. Inasmuch as the new pressed mass can be easily introduced into molds in the form of a fine powder, it is not only possible to produce very complicated designs, but also to insert core pieces in the molds, which if desired, can be taken out of the finished articles so as to produce hollow spaces of any desired shape therein. It is also possible to coat with pressed mass objects of other materials such as wood or metal or to obtain pressed articles in which metal pieces are firmly embedded. For example it is possible to provide a pressed mass with embedded pieces of metal which, inasmuch as the pressed mass has good insulating properties, are of great use for various kinds of electrical apparatus. It is also possible to provide metal or other articles with said pressed mass by compressing the mass in suitable recesses provided in such articles, such as for instance, insulating buttons in electrical apparatus and the like.

The disintegration of the pressed mass can be simplified by causing it to leave the press cylinder of the first pressing operation whilst still in a hot state through openings such as channels, instead of disintegrating it by mechanical means. These openings may either be simple channels, nozzles or slots, and they may be of uniform, or irregular cross section, or they may be arranged in bends, for instance in the shape of a zig-zag or the like, and they may also be crooked. By this means according to the shape of the opening or channel filaments, ribbons, rods and the like are formed which can be easily pulverized and moreover the pressed mass is transformed into a thoroughly mixed homogeneous and easily pulverized form especially if the mixing chambers are provided with narrow nozzle orifices. According to the cross section of the openings in the press cylinders the mass issuing from said cylinder into the open air forms filaments, ribbons or rods and the like of any desired cross section. If the pressed mass is not extruded from these channels or other openings into the open, but into a mold screwed or otherwise attached to the pressing cylinder, the desired pressed article is produced directly in said mold and no previous disintegration of the primary pressed mass is required. In this way from a mixture of cellulose esters such as cellulose acetate and filling materials if desired with the addition of plastifying agents or camphor substitutes it is possible to obtain molded pieces ready for use in one single operation by pressing in one cylinder and extruding into a form connected to this cylinder.

Whereas for the production of ebonite like and especially highly insulating pressed pieces is it generally necessary to use pure cellulose acetate and filling materials without the addition of softening agents or only with a very small addition of these materials, it is possible to use for many purposes also softer mixtures with a high content in camphor substitutes. In this case it is not necessary to produce the primary mass under pressure but it can be produced according to the usual methods for the production of plastic masses from cellulose acetate and camphor substitutes. For this purpose the plastic masses produced by means of solvents or gelatinizing agents are quickly dried and then whilst still in the rough state or in the form of blocks, sheets or rods are mechanically disintegrated and thereupon pressed into molds in a similar manner to that employed with the disintegrated primary pressed mass. The plastic masses produced in the above described manner can also be disintegrated in the same way as the primary mass by extruding them from a press cylinder, under pressure and heat, in the shape of filaments or ribbons and the like, and then filling them into a mold and submitting said mold to pressure. Or the primary pressed mass can, whilst still in a hot state, be forced from the press cylinder under pressure into the molds, and thereby be transformed without disintegration into finished molded articles which are ready for use.

It is remarkable that the pressed masses according to the present process can withstand, when submitted to high pressure, temperatures far in excess of their softening points, without being decomposed, and that they are not rendered brittle either by the excessive heat or by the addition of pulverulent materials, but on the contrary, have a greater mechanical stability than that which they possessed prior to the pressing or in the absence of these admixtures.

For carrying out the new pressing process the simultaneous use of heavy pressure as well as high temperature is essential. The second pressing, that is the production of molded articles from the disintegrated pressed mass of the primary pressing operation or from disintegrated plastic masses obtained from cellulose esters or cellulose acetate according to the known processes, can also be effected at a lower pressure and at a lower temperature. For this pressing also hand-presses, lever presses and the like may be used. The higher the pressure produced with these presses, the lower the temperature needed.

It is also possible without departing from the invention to provide the molds with a plurality of subsidiary molds whereby a plurality of objects are simultaneously molded.

Although in the foregoing, special mention is made of cellulose esters and cellulose acetate it is to be understood that mixtures of nitro-cellulose and cellulose acetate may be used in the present process, or the cellulose acetate may be wholly or partly replaced by other cellulose esters such as formyl-cellulose, aceto-nitro-cellulose, dinitro-cellulose or the like or cellulose-ethyl-ether and the like.

What I claim and desire to secure by Letters Patent is:—

1. The process for the production of an ungelatinized pressed mass, which comprises submitting a compound of cellulose with an organic substance mixed with material including filling substances, in a finely disintegrated state, to heavy pressure at a high temperature.

2. The process for the production of an ungelatinized pressed mass, which comprises submitting a compound of cellulose with an organic substance mixed with material including filling substances, in a finely disintegrated state and a plastifying agent to heavy pressure at a high temperature.

3. The process for the production of an ungelatinized pressed mass, which comprises submitting a compound of cellulose with an organic substance mixed with material including filling substances in a finely disintegrated state and a volatile substance, to heavy pressure at a high temperature.

4. The process for the production of an ungelatinized pressed mass, which comprises submitting a compound of cellulose with an organic substance mixed with material including filling substances, in a finely disintegrated state, a plastifying agent and a volatile substance, to heavy pressure at a high temperature.

5. The process for the production of an ungelatinized pressed mass, which comprises submitting cellulose acetate mixed with material including filling substances, in a finely disintegrated state, to heavy pressure at a high temperature.

6. The process for the production of an ungelatinized pressed mass, which comprises submitting cellulose acetate mixed with material including filling substances, in a finely disintegrated state and a plastifying agent, to heavy pressure at a high temperature.

7. The process for the production of an ungelatinized pressed mass, which comprises submitting cellulose acetate mixed with material including filling substances, in a finely disintegrated state and a volatile substance, to heavy pressure at a high temperature.

8. The process for the production of an ungelatinized pressed mass, which comprises submitting cellulose acetate mixed with material including filling substances, in a finely disintegrated state, a plastifying agent and a volatile substance, to heavy pressure at a high temperature.

9. The process for the production of an ungelatinized pressed mass, which comprises submitting a compound of cellulose with an organic substance mixed with material including filling substances, in a finely disintegrated state, to heavy pressure at a high temperature and mechanically disintegrating said pressed mass.

10. The process for the production of an ungelatinized pressed mass, which comprises submitting a compound of cellulose with an organic substance mixed with material including filling substances, in a finely disintegrated state and a plastifying agent, to heavy pressure at a high temperature and mechanically disintegrating said pressed mass.

11. The process for the production of an ungelatinized pressed mass, which comprises submitting a compound of cellulose with an organic substance mixed with material including filling substances, in a finely disintegrated state and a volatile substance, to heavy pressure at a high temperature and mechanically disintegrating said pressed mass.

12. The process for the production of an ungelatinized pressed mass, which comprises submitting a compound of cellulose with an organic substance mixed with material including filling substances, in a finely disintegrated state, a plastifying agent and a volatile substance, to heavy pressure at a high temperature and mechanically disintegrating said pressed mass.

13. The process for the production of an ungelatinized pressed mass, which comprises submitting a compound of cellulose with an organic substance mixed with material including filling substances, in a finely disintegrated state, to heavy pressure at a high temperature, mechanically disintegrating said pressed mass and subjecting said pulverized mass to a second pressing in suitable moulds at a lower pressure and lower temperature.

14. The process for the production of an ungelatinized pressed mass, which comprises submitting a compound of cellulose with an organic substance mixed with material including filling substances, in a finely disintegrated state and a plastifying agent, to heavy pressure at a high temperature, mechanically disintegrating said pressed mass and subjecting said pulverized mass to a second pressing in suitable moulds at a lower pressure and lower temperature.

15. The process for the production of an ungelatinized pressed mass, which comprises submitting a compound of cellulose with an organic substance mixed with material including filling substances, in a finely disintegrated state and a volatile substance, to heavy pressure at a high temperature, mechanically disintegrating said pressed mass and subjecting said pulverized mass to a second pressing in suitable moulds at a lower pressure and lower temperature.

16. The process for the production of an ungelatinized pressed mass, which comprises submitting a compound of cellulose with an organic substance mixed with material including filling substances, in a finely disintegrated state, a plastifying agent and a volatile substance, to heavy pressure at a high temperature, mechanically disintegrating said pressed mass and subjecting said pulverized mass to a second pressing in suitable moulds at a lower pressure and lower temperature.

17. The process for the production of an ungelatinized pressed mass, which comprises submitting a compound of cellulose with an organic substance mixed with material including filling substances, in a finely disintegrated state, to heavy pressure at a high temperature, and disintegrating said pressed mass by forcing same whilst still hot through openings.

18. The process for the production of an ungelatinized pressed mass, which comprises submitting a compound of cellulose with an organic substance mixed with material including filling substances, in a finely disintegrated state and a plastifying agent, to heavy pressure at a high temperature, and disintegrating said pressed mass by forcing same whilst still hot through openings.

19. The process for the production of an ungelatinized pressed mass, which comprises submitting a compound of cellulose with an organic substance mixed with material including filling substances, in a finely disintegrated state and a volatile substance, to heavy pressure at a high temperature, and disintegrating said pressed mass by forcing same whilst still hot through openings.

20. The process for the production of an ungelatinized pressed mass, which comprises submitting a compound of cellulose with an organic substance mixed with material including filling substances, in a finely disintegrated state, a plastifying agent and a volatile substance, to heavy pressure at a high temperature, and disintegrating said pressed mass by forcing same whilst still hot through openings.

21. The process for the production of an ungelatinized pressed mass, which comprises submitting a compound of cellulose with an organic substance mixed with material including filling substances, in a finely disintegrated state, to heavy pressure at a high temperature, disintegrating said pressed mass by forcing same whilst still hot through openings, and subjecting said disintegrated mass to a second pressing in suitable molds at a lower pressure and lower temperature.

22. The process for the production of an ungelatinized pressed mass, which comprises submitting a compound of cellulose with an organic substance mixed with material including filling substances, in a finely disintegrated state and a plastifying agent, to heavy pressure at a high temperature, disintegrating said pressed mass by forcing same whilst still hot through openings, and subjecting said disintegrated mass to a second pressing in suitable molds at a lower pressure and lower temperature.

23. The process for the production of an ungelatinized pressed mass, which comprises submitting a compound of cellulose with an organic substance mixed with material including filling substances, in a finely disintegrated state and a volatile substance, to heavy pressure at a high temperature, disintegrating said pressed mass by forcing same whilst still hot through openings, and subjecting said disintegrated mass to a second pressing in suitable molds at a lower pressure and lower temperature.

24. The process for the production of an ungelatinized pressed mass, which comprises submitting a compound of cellulose with an organic substance mixed with material including filling substances, in a finely disintegrated state a plastifying agent and a volatile substance, to heavy pressure at a high temperature, disintegrating said pressed mass by forcing same whilst still hot through openings, and subjecting said disintegrated mass to a second pressing in suitable molds at a lower pressure and lower temperature.

25. The process for the production of an ungelatinized pressed mass, which comprises submitting a compound of cellulose with an organic substance mixed with material including filling substances, in a finely disintegrated state, to heavy pressure at a high temperature, disintegrating said pressed mass, admixing said disintegrated mass with large amounts of finely disintegrated materials, and subjecting said mixture to a second pressing in molds under pressure and heat.

26. The process for the production of an ungelatinized pressed mass, which comprises submitting a compound of cellulose with an organic substance mixed with material including filling substances, in a finely disintegrated state and a plastifying agent, to heavy pressure at a high temperature, disintegrating said pressed mass, admixing said disintegrated mass with large amounts of finely disintegrated materials, and subjecting said mixture to a second pressing in molds under pressure and heat.

27. The process for the production of an ungelatinized pressed mass, which comprises submitting a compound of cellulose with an organic substance mixed with material including filling substances, in a finely disintegrated state and a volatile substance, to heavy pressure at a high temperature, disintegrating said pressed mass, admixing said disintegrated mass with large amounts of finely disintegrated materials, and subjecting said mixture to a second pressing in molds under pressure and heat.

28. The process for the production of an ungelatinized pressed mass, which comprises submitting a compound of cellulose with an organic substance mixed with material including filling substances, in a finely disintegrated state a plastifying agent and a volatile substance, to heavy pressure at a high temperature, disintegrating said pressed mass, admixing said disintegrated mass with large amounts of finely disintegrated materials, and subjecting said mixture to a second pressing in molds under pressure and heat.

29. The process for the production of an ungelatinized pressed mass in one single operation, which comprises pressing a compound of cellulose with an organic substance mixed with material including filling substances, in a finely disintegrated state under heavy pressure at a high temperature, through openings into a closed mold, whilst still hot and under pressure.

30. The process for the production of an ungelatinized pressed mass in one single operation, which comprises pressing a compound of cellulose with an organic substance mixed with material including filling substances, in a finely disintegrated state and a plastifying agent, under heavy pressure at a high temperature, through openings into a closed mold, whilst still hot and under pressure.

31. The process for the production of an ungelatinized pressed mass in one single operation, which comprises pressing a compound of cellulose with an organic substance mixed with material including filling substances, in a finely disintegrated state, and a volatile substance under heavy pressure at a high temperature, through openings into a closed mold, whilst still hot and under pressure.

32. The process for the production of an ungelatinized pressed mass in one single operation, which comprises pressing a compound of cellulose with an organic substance mixed with material including filling substances, in a finely disintegrated state, a plastifying agent and a volatile substance, under heavy pressure at a high temperature through openings into a closed mold, whilst still hot and under pressure.

33. An ungelatinized pressed mass produced by submitting a compound of cellulose with an organic substance mixed with material including filling substances in a finely disintegrated state to heavy pressure at a high temperature.

34. An ungelatinized pressed mass produced by submitting a compound of cellulose with an organic substance mixed with material including filling substances in a finely disintegrated state and plastifying agent, to heavy pressure at a high temperature.

35. An ungelatinized pressed mass produced by submitting a compound of cellulose with an organic substance mixed with material including filling substances in a finely disintegrated state and a volatile substance to heavy pressure at a high temperature.

36. An ungelatinized pressed mass produced by submitting a compound of cellulose with an organic substance mixed with material including filling substances in a finely disintegrated state a plastifying agent and a volatile substance, to heavy pressure at a high temperature.

37. Molded articles consisting of an ungelatinized pressed mass of a compound of cellulose with an organic substance produced by submitting cellulose acetate mixed with material including filling substances in a finely disintegrated state, to heavy pressure at a high temperature.

In testimony whereof I affix my signature

RICHARD HERRMANN

Witnesses:
  GEORGE RIEHIG,
  F. HEATO.